(12) United States Patent
Bates et al.

(10) Patent No.: US 8,141,046 B2
(45) Date of Patent: Mar. 20, 2012

(54) THREAD SWAP VISUAL INDICATION

(75) Inventors: Cary Lee Bates, Rochester, MN (US); Victor John Gettler, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 11/869,099

(22) Filed: Oct. 9, 2007

(65) Prior Publication Data
US 2009/0094581 A1 Apr. 9, 2009

(51) Int. Cl.
*G06F 9/44* (2006.01)
(52) U.S. Cl. .......... 717/125; 717/129; 717/131
(58) Field of Classification Search .......... 717/106–119, 717/124–134
See application file for complete search history.

(56) References Cited

U.S. PATENT DOCUMENTS 6,223,335 B1 * 4/2001 Cartwright et al. .......... 717/100
6,611,276 B1 8/2003 Muratori et al.

OTHER PUBLICATIONS

Mehner et al., "Visualizing the Synchronization of Java-Threads with UML", 2000, IEEE, pp. 199-206.*
David Keppel., "Register Windows and User-Space Threads on the SPARC", Aug. 1991, University of Washington, Seattle, WA, p. 1-19.*
Carr et al, "ThreadMentor: A Pedagogical Tool for Multithreaded Programming", Mar. 2003, ACM, pp. 1-30.*
"User's Guide—Optimizeit Thread Debugger", Borland Software Corporation, 2004,USA, pp. 1-21.
"Debug Parallel MPI and OpenMP Applications for Linux Clusters and SMP Servers", PGDBG Linux Cluster Debugger, developrs-source, pp. 1-4, retrieved Jul. 19, 2007. http://www.developers-source.de/ortogo/projects/devcomp/index.php?id=pgdbg.
"Intel Debugger (IDB) Manual", Document No. 306363-001, pp. 1-274, retrieved Jul. 19, 2007. http://www.intel.com/software/products/compilers/docs/linux/idb_manual_1.html.

* cited by examiner

*Primary Examiner* — Ted T Vo
(74) *Attorney, Agent, or Firm* — Yee & Associates, P.C.; John R. Pivnichny

(57) ABSTRACT

A computer implemented method, apparatus, and computer usable program code for indicating thread swaps. A code is presented on a graphical user interface. A portion of the code is executed. A determination is made as to whether a change from an initial thread to a current thread occurred when execution of the portion of the code stops at a line of code in the portion of the code. A graphical indication is displayed identifying a thread swap in the graphical user interface in association with the line of code in which the thread swap occurred.

15 Claims, 3 Drawing Sheets

THREAD SWAP VISUAL INDICATION

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer usable program code for examining instructions or code for an application.

2. Description of the Related Art

A debugger is an application that is used to test and debug other applications. An application, in these examples, is program code that may contain one or more programs that form the application. Debugging is a process of finding and reducing the number of errors, flaws, mistakes, failures, faults, and/or defects in program code, such as an application. Debugging is performed to identify changes that may be needed to insure that an application behaves or executes as expected.

When an application crashes, a debugger may show the position in the original code where the crash or error occurred. Debuggers also may offer functions, such as running an application step-by-step. Also, debuggers may allow stopping or pausing the application to examine the current state of the data processing system. This kind of stopping or breaking may occur through a breakpoint. A breakpoint is a location in an application in which program execution is interrupted. A breakpoint provides a mechanism to acquire knowledge and data about a program during execution. A breakpoint may have one or more conditions that determine when an application's execution should interrupt.

During the interruption, a user may inspect various environmental information to determine whether an application is functioning as expected. Some debuggers also have an ability to modify the state of the application during execution, rather than merely observing the execution of the program.

When debugging a threaded application, most debuggers stop all threads when a breakpoint is hit or a step completes. Currently, when a user steps through an application using a debugger, it may appear that the debugger keeps the user in the same thread while stepping occurs. This kind of situation, however, is unlikely. Keeping the user in the same thread and not allowing other threads to run can easily produce a deadlock when the user steps over a semaphore or steps over a routine that contains a mechanism to guard against corrupting a resource.

Currently, this problem is solved in debugger applications by giving the thread that is denoted or identified as the current thread a head start before the debugger starts releasing other threads. This head start may be, for example, a millisecond or a second. This type of process allows the application being debugged to stay in the current thread while stepping through code.

With this type of processing, the first thread that reaches a statement boundary stops at the statement boundary. A statement may require a set of instructions, such as one or more assembly instructions to perform the statement in code. This statement is also referred to as a line. The statement boundary is reached when the first instruction for a statement is about to be executed. The first thread to execute and reach a statement boundary causes the step to complete. The thread reaching a statement boundary becomes the current thread and the source for this thread is displayed and the stop position is indicated.

One problem that may occur is that in many instances multiple threads are running on the same piece of code. When a thread swap occurs during stepping, it often appears to the user that the debugger is malfunctioning or broken because the user believes that the application is in the same thread and the code cannot possibly execute the order indicated on the interface displayed to the user. In other words, with this type of debugging, instructions may not appear to be executing in the order expected by the user. Therefore, it would be advantageous to have an improved method and apparatus for solving the problems described above.

SUMMARY OF THE INVENTION

The illustrative embodiments provide a computer implemented method, apparatus, and computer usable program code for indicating thread swaps. A code is presented on a graphical user interface. A portion of the code is executed. A determination is made as to whether a change from an initial thread to a current thread occurred when execution of the portion of the code stops at a line of code in the portion of the code. A graphical indication is displayed identifying a thread swap in the graphical user interface in association with the line of code in which the thread swap occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
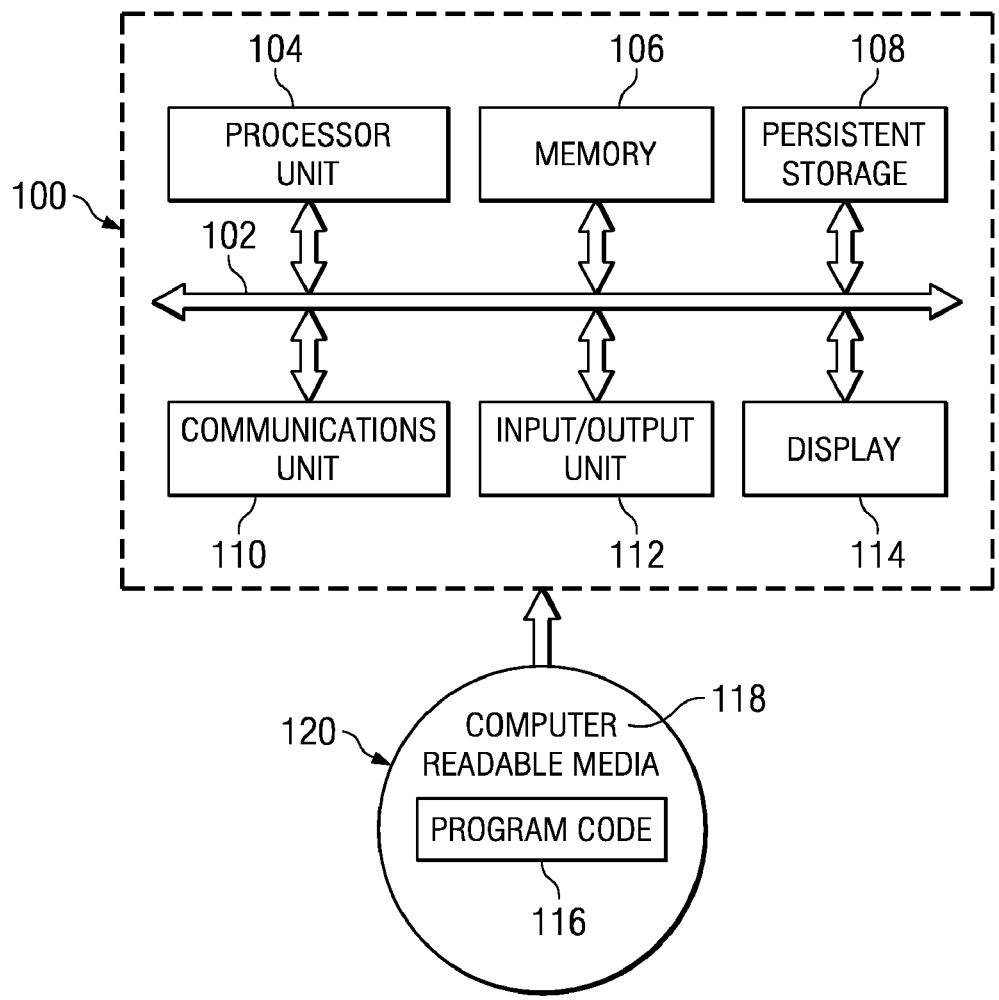
FIG. 1 is a diagram of a data processing system in accordance with an illustrative embodiment.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or nonvolatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code. In these examples, program code may be an application such as debugger including processes to alert a user to a thread swap occurring during the debugging process. In these examples, program code 116 may include code for a debugging process and/or application. In particular, program code 116 may include code to provide visual indications of when thread execution changes or swaps during debugging of an application.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

For example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different advantageous embodiments recognize that statements or lines of code may not appear to be executed in the expected order because of the occurrence of a thread swap. The different illustrative embodiments realize that no real mechanism is present to know how long to wait before releasing other threads to avoid a deadlock. As a result, avoiding a thread stop during stepping may not be possible. Further, the different illustrative embodiments recognize that making the step only complete in the current thread may also confuse the user because the program may terminate on the line that it should not have terminated on and the program may run for some long period of time before the deadlock is resolved and the step stops.

Thus, in view of the problems recognized by the different illustrative embodiments, the illustrative embodiments recognize that a need is present for an improved mechanism to indicate when a thread swap has occurred during stepping to avoid confusion. The different illustrative embodiments recognize that a separate window in the debugger may indicate or identify the current thread. The different illustrative embodiments also recognize, however, this type of indication often is insufficient to obtain or attach the user's attention and indicate to the user that something has happened or occurred.

Figure 2:
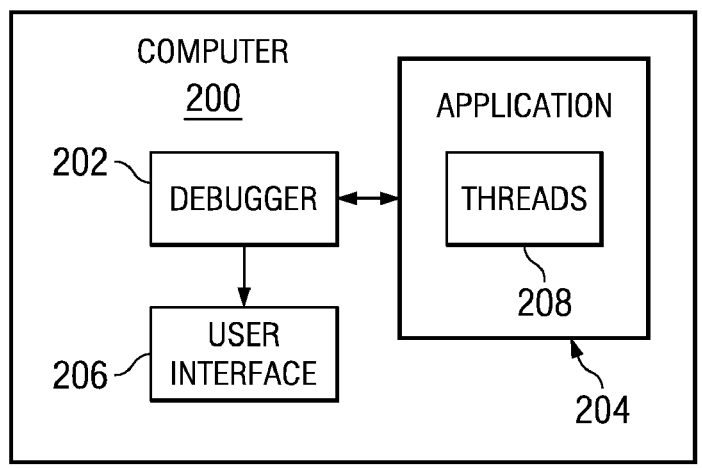
FIG. 2 is a block diagram illustrating components used in providing visual indications of thread swaps in accordance with an illustrative embodiment.

With reference now to FIG. 2, a block diagram illustrating components used in providing visual indications of thread swaps is depicted in accordance with an illustrative embodiment. In these examples, computer 200 may be implemented using a data processing system, such as data processing system 100 in FIG. 1. In these examples, debugger 202 executes on computer 200 to perform debugging functions for a program or application, such as application 204. User interface 206 is a functional component that provides a user of computer 200 an ability to control the operation of debugger 202 and to view results or data generated by debugger 202.

Debugger 202 and the presentation of user interface 206 may be implemented using various debugger programs with modifications to include processes to provide visual indications of thread swaps. One example of a debugger that may be modified to include processes described in the different illustrative embodiments is Rational Purify, which is available from International Business Machines Corporation. Yet another illustrative example is the Java® Platform Debugger Architecture (JPDA), which is available from Sun Microsystems Corporation. Of course, any suitable debugger may be used and modified to include processes illustrated in the different illustrative embodiments. In this example, application 204 is a multithreaded application containing threads 208.

The different illustrative embodiments provide a computer implemented method, apparatus, and computer usable program code for visual indication of thread swaps. The different illustrative embodiments employ text attributes in displaying text of code and instructions in user interface 206. In the illustrative examples, a first thread attribute and a second thread attribute are present. These thread attributes are used, in the different illustrative embodiments, to provide the indications of thread swaps that occur during debugging of code, such as that found in application 204 if a swap in execution occurs within threads 208.

Debugger 202 renders or displays text of code or instructions being executed in user interface 206. The first thread attribute is used, in these examples, unless during stepping a thread swap occurs. In this type of situation, debugger 202 displays the text in user interface 206 with changes based on the second thread attribute. A thread attribute defines how to display an indication in association with a line or statement as being associated with a thread.

These thread attributes may take various forms. For example, without limitation, text attributes may include color, font size, background color, bolding, italics, and graphical indicators. Also, text attributes may be assigned to particular threads in threads 208. As a result, whenever debugger 202 executes code for a particular thread, the text is displayed according to the attribute for the thread.

In this manner, the different advantageous embodiments provide an additional alert or indication mechanism to indicate when a swap thread has occurred. This type of mechanism is especially useful with users who focus on the text of the instructions or code being executed and their presentation within user interface 206 by debugger 202.

Figure 3:
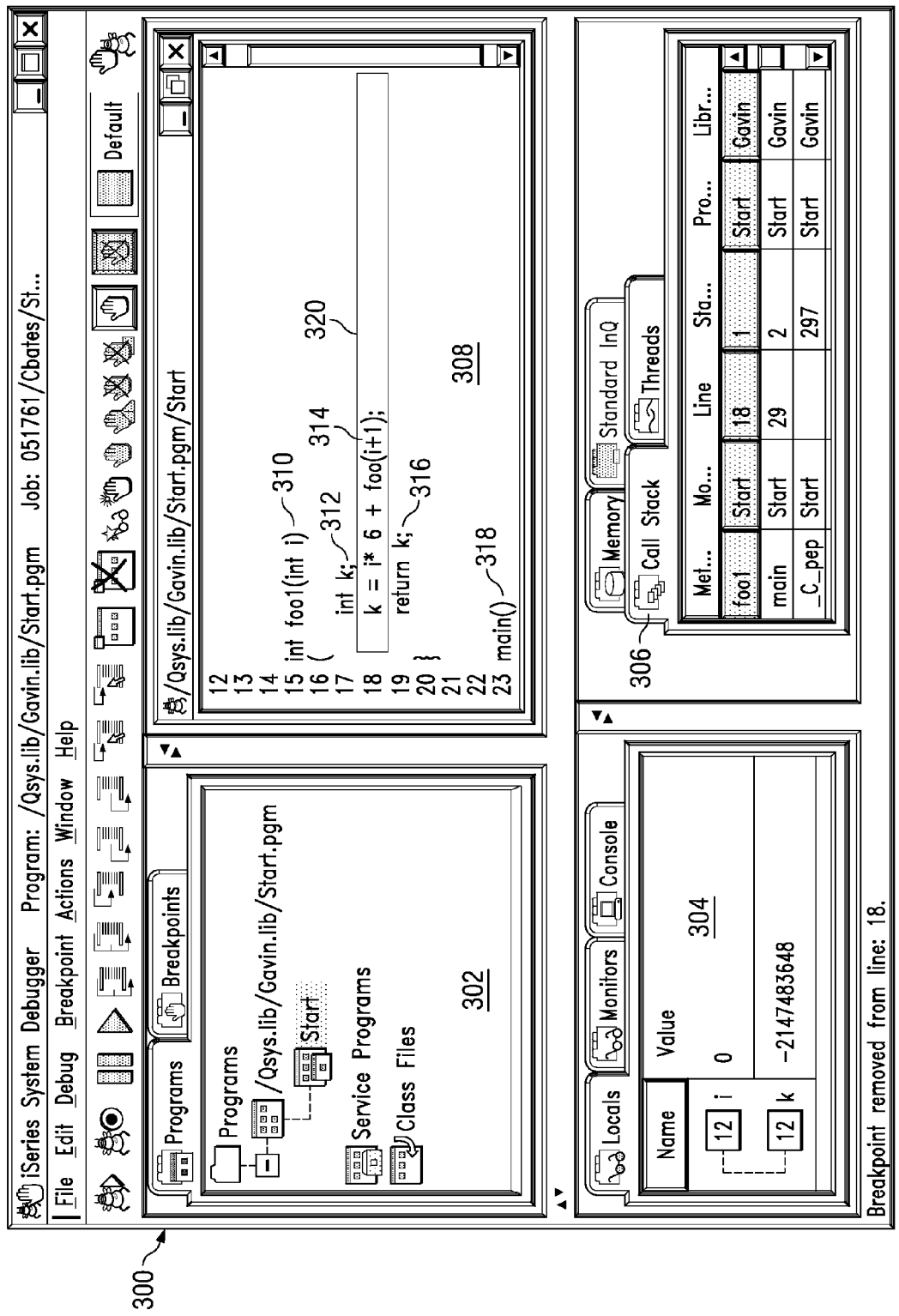
FIG. 3 is a diagram of a user interface in accordance with an illustrative embodiment.

Turning next to FIG. 3, a diagram of a user interface is depicted in accordance with an illustrative embodiment. In this example, window 300 is an example of a graphical user interface that may be presented as part of user interface 206 by debugger 202 in FIG. 2. In this example, window 300 presents an identification of programs in section 302, variables in section 304, call stack information in section 306, and instructions or code for the application being debugged in section 308.

In this example, lines 310, 312, 314, 316, and 318 are lines of code currently being displayed within section 308 of window 300. These lines may represent a portion of code for an application that may be executed in debugging the application. Each line of code also is referred to as a statement, in these examples. Often times, these lines or statements of code are in a higher level language, such as Java® or C. The execution of each line or statement typically requires a number of machine or assembly code instructions in which a thread swap from an initial thread to a current thread may occur during the execution of one or more statements.

In this example, each line of code may be performed by executing a set of instructions, such as assembly instructions. In some cases, a current thread may swap to another thread during the execution of instructions that may make up a statement or line of code. In this example, lines, such as line 314, are displayed in a red color until another thread swap occurs. In the depicted examples, the graphical indication is then changed back to the first thread attribute.

These indications, however, in these examples, do not identify the particular thread but only identify that a thread swap has occurred. In some cases, particular graphical indicators may be associated with particular threads of interest to identify when a thread swap has occurred involving that particular thread.

Lines 310, 312, 316, and 318 are presented in one color, in these examples, using a first thread attribute. In this example, the first thread attribute may be black text with a white background. Line 314 is displayed using a second thread attribute. This second thread attribute may be, for example, red text on a white background. Of course, any type of visual indication may be used. The different thread attributes may take many forms for example, without limitation, a color, highlighting, box, or other graphical indicator to indicate when a thread swap occurs. In this particular example, line 314 is displayed using box 320. Box 320 indicates the stopping point or breakpoint. Additionally, the graphical indicator may be associated with line 314 by altering the display of box 320 in addition to or in place of displaying line 314 in red text with a white background.

For example, box 320 may be displayed in black when a thread swap has not occurred. Box 320 may then be displayed in another color and/or with dotted lines, or some suitable other graphical indicator, when a thread swap has occurred. Of course, any type of graphical indicator may be used to gain or obtain the attention of the user viewing window 300.

The change in the presentation of line 314 indicates to the user that a thread swap has occurred. In these examples, the thread swap has occurred during the execution of line 314 with a step-by-step execution of code. In another example, lines 310, 312, 316, and 318 may be displayed in one color. Line 314 may be displayed in a different color to indicate that a thread swap has occurred, instead of presenting box 320 with a graphical indication.

In addition, the indication that a thread swap has occurred also may be used through other graphical indications, such as animations. One feature providing an ability to gain a user's attention to indicate that a thread swap has occurred is that the visual indication is presented in association with the statement or line of code. This type of presentation of a graphical indicator is useful because the user's attention is typically directed towards the line of code or statement where execution has stopped.

Figure 4:
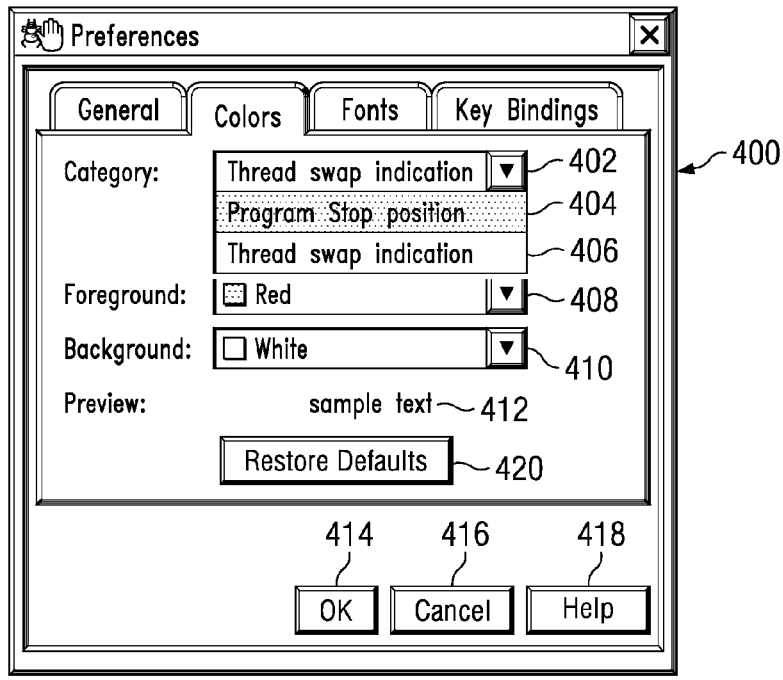
FIG. 4 is a diagram illustrating a user interface to set preferences for thread attributes in accordance with an illustrative embodiment.

Turning next to FIG. 4, a diagram illustrating a user interface used to set preferences for thread attributes is depicted in accordance with an illustrative embodiment. In this example, window 400 allows a user to select colors for different indications through control 402. Entry 404, in these examples, may allow a user to enter or select attributes for a first thread attribute. Entry 406 may allow a user to select or enter attributes for a second thread attribute. The program stop position in entry 404 allows a user to select thread attributes to display text when the program has stopped executing, such as when a program steps from one statement to another statement. Entry 406 allows a user to define another thread attribute when a thread swap has occurred.

In these examples, a user may define these thread attributes with foreground and background colors using controls 408 and 410. A preview of the attributes may be presented in section 412. A user may accept the selected attributes by selecting OK button 414. The user may cancel any changes through cancel button 416. Default values for the thread attributes may be selected by selecting restore defaults button 420. Explanations for different attributes and controls may be presented through a selection of help button 418.

In this manner, a user may set different thread attributes for presenting execution of statements in an application through window 400. Window 400 is presented as an example of one manner in which thread attributes may be selected, and presents one type of scheme for presenting indications of a visual swap between threads. Of course, this example is not meant to limit the manner in which thread attributes may be selected or the type of attributes that may be used. For example, the attributes may be entered directly into a file by user with a text editor instead of a graphical interface, such as window 400. Other graphic indicators such as font size, animations, and graphical images may be used as other types of indications for a thread swap.

Figure 5:
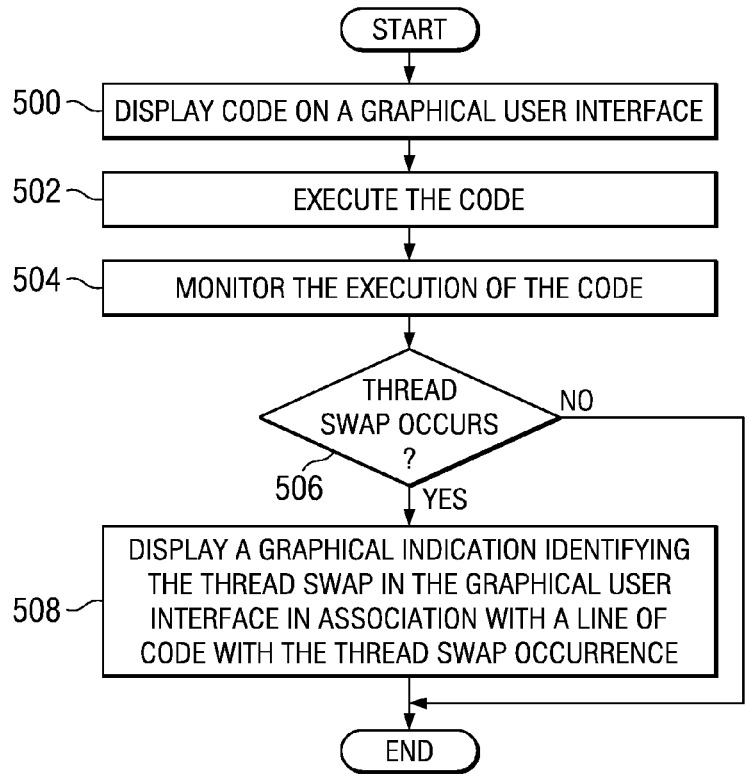
FIG. 5 is a flowchart of a process for indicating thread swaps in accordance with an illustrative embodiment.

With reference now to FIG. 5, a flowchart of a process for indicating thread swaps is depicted in accordance with an illustrative embodiment. The process illustrated in this example may be implemented in a software component, such as debugger 202 in FIG. 2, to identify when thread swaps occur and indicate those thread swaps in a manner that obtains the attention of the user.

The process begins by displaying code on a graphical user interface (step 500). One example of such a display is window 300 in FIG. 3. In particular, section 310 in FIG. 3 illustrates a display of a code. In the example illustrated in FIG. 3, only a portion of the code being executed is displayed within section 308 in FIG. 3.

Next, the process executes the code (step 502). This execution may take various forms. For example, the execution may be a step-by-step execution in which instructions, such as assembly instructions, are executed for a statement for a line of code. In this type of debugging, the process halts the execution of the code after a line of code has been executed. The process also monitors the execution of the code (step 504). Although step 504 is shown as sequential with respect to step 502, these two steps occur simultaneously in actual implementation.

In monitoring the execution of the code in step 504, the process determines whether a thread swap has occurred in step 502. Next, a determination is made as to whether a thread swap has occurred in monitoring the execution of the code (step 506). If a thread swap occurs, a graphical indication identifying the thread swap in the graphical user interface is displayed in association with the line of code in which the thread swap occurred (step 508), with the process terminating thereafter.

With reference again to step 506, if a thread swap has not occurred during the execution of the code, the process terminates and a graphical indication is not displayed in association with the line of code that has been executed, in these examples.

This process may be repeated each time a line of code is executed in a step-by-step execution of code. The indication of a thread swap may be identified for other instances in code execution other than line-by-line execution of code.

For example, if breakpoints are used, the execution of code in step 502 may be performed until the breakpoint is reached. In this type of implementation, the execution of the portion of code terminates at a particular line or statement. The determination of whether a thread swap occurs, in these examples, is made by determining whether the current thread in the line where execution stopped is the same thread as the initial thread. In this type of debugging process, the same determination is made as with a step-by-step process when execution stops at the breakpoint.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer usable program code for indicating thread swaps. Code is displayed on a graphical user interface. A portion of the code is executed and a determination is made as to whether a change from an initial thread to a current thread occurred when execution of the portion of the code stops. If a change from an initial thread to a current thread has occurred, a graphical indication identifying a thread swap in the graphical user interface is displayed in association with a line of code in which the thread swap occurred in these examples.

In this manner, the different illustrative embodiments allow for gaining the attention of the user to indicate that a thread swap has occurred. The different illustrative embodiments present this graphical indication in a location associated with the line of code where the thread swap occurs and execution of the code stops. In this manner, a more efficient use of a user's time may occur with respect to debugging applications and code for applications.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, although the different illustrative embodiments are described with respect to visual indications, other types of indications also may be used in addition to or in place of visual indications. As a non-limiting example, an audio indication may be used to gain the attention of the user to indicate when during debugging of an application. As another example, only two thread attributes are described with respect to the different illustrative examples. The different embodiments, however, are not limited to using only two thread attributes for presenting indications of when a thread swap has occurred during a debugging process. For example, three, six, or eight thread attributes may be used. Some thread attributes may be assigned to particular threads of interest while other thread attributes may be used for other events or conditions that occur in conjunction with the thread swap. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for indicating thread swaps, the computer implemented method comprising:
   presenting, by a debugger in the computer, code on a graphical user interface, wherein the code presented on the graphical user interface is code of an application that is currently running;
   executing, by the debugger in the computer, a portion of the code of the application until a breakpoint is reached at a line of code in the portion of the code;
   responsive to execution of the portion of code of the application reaching the breakpoint at the line of code in the portion of code, determining, by the debugger in the computer, whether a change from an initial thread of the currently running application to a current thread of the currently running application occurred when execution of the portion of the code stops at the line of code in the portion of the code; and
   responsive to a change from the initial thread to the current thread, displaying, by the debugger in the computer, a graphical indication identifying a thread swap in the graphical user interface of the debugger in association with the line of code in which the thread swap occurred in the currently running application.

2. The computer implemented method of claim 1, wherein the executing step comprises:
   executing, by the debugger in the computer, the code of the currently running application in a step-by-step mode in which the portion of the code is a line of code.

3. The computer implemented method of claim 1, wherein the graphical indication is a thread text attribute defined to indicate the thread swap has occurred, and wherein the thread text attribute is one or more of color, font size, background color, bolding, and italics.

4. The computer implemented method of claim 1, wherein the presenting step comprises:
   presenting, by the debugger in the computer, the portion of the code using a first thread attribute.

5. The computer implemented method of claim 4, wherein the displaying step comprises:
   responsive to a change from the initial thread to the current thread, displaying, by the debugger in the computer, the graphical indication identifying the thread swap in the graphical user interface in association with the line of code in which the thread swap occurred using a second thread attribute different from the first thread attribute.

6. A computer program product for indicating thread swaps, the computer program product comprising:
   a computer readable media, wherein the computer readable media is a non-transitory computer storage medium;
   program code, stored on the computer readable media, for presenting, by a debugger, code on a graphical user interface, wherein the code presented on the graphical user interface is code of an application that is currently running;
   program code, stored on the computer readable media, for executing, by the debugger, a portion of the code of the application until a breakpoint is reached at a line of code in the portion of the code;
   program code, stored on the computer readable media, for determining, by the debugger, whether a change from an initial thread of the currently running application to a current thread of the currently running application occurred when execution of the portion of the code stops at the line of code in the portion of the code, responsive to execution of the portion of code of the application reaching the breakpoint at the line of code in the portion of code; and
   program code, stored on the computer readable media, responsive to a change from the initial thread to the current thread, for displaying, by the debugger, a graphical indication identifying a thread swap in the graphical user interface of the debugger in association with the line of code in which the thread swap occurred in the currently running application.

7. The computer program product of claim 6, wherein the program code, stored on the computer readable media, for executing the portion of the code comprises:
   program code, stored on the computer readable media, for executing, by the debugger, the code of the currently running application in a step-by-step mode in which the portion of the code is a line of code.

8. The computer program product of claim 6, wherein the graphical indication is a thread text attribute defined to indicate the thread swap has occurred, and wherein the thread text attribute is one or more of color, font size, background color, bolding, and italics.

9. The computer program product of claim 6, wherein the program code, stored on the computer readable media, for presenting code on the graphical user interface comprises:
   program code, stored on the computer readable media, for presenting, by the debugger, the portion of the code using a first thread attribute.

10. The computer program product of claim 9, wherein the program code, stored on the computer readable media, responsive to the change from the initial thread to the current thread, for displaying, by the debugger, the graphical indication identifying the thread swap in the graphical user interface of the debugger in association with the line of code in which the thread swap occurred in the currently running application comprises:
    program code, stored on the computer readable media, responsive to a change from the initial thread to the current thread, for displaying, by the debugger, the graphical indication identifying the thread swap in the graphical user interface in association with the line of code in which the thread swap occurred using a second thread attribute different from the first thread attribute.

11. A data processing system comprising:
a bus;
a communications unit connected to the bus;
a storage device connected to the bus, wherein the storage device includes program code; and
a processor unit connected to the bus, wherein the processor unit executes the computer usable program to present, by a debugger, code on a graphical user interface, wherein the code presented on the graphical user interface is code of an application that is currently running; execute, by the debugger, a portion of the code of the application until a breakpoint is reached at a line of code in the portion of the code; determine, by the debugger, whether a change from an initial thread of the currently running application to a current thread of the currently running application occurred when execution of the portion of the code stops at the line of code in the portion of the code, responsive to execution of the portion of code of the application reaching the breakpoint at the line of code in the portion of code; and display, by the debugger, a graphical indication identifying a thread swap in the graphical user interface in association with the line of code in which the thread swap occurred in the currently running application in response to a change from the initial thread to the current thread.

12. The data processing system of claim 11, wherein in executing the program code to execute, by the debugger, the portion of the code of the currently running application, the processor unit executes the computer usable program code to execute, by the debugger, the code of the currently running application in a step-by-step mode in which the portion of the code is a line of code.

13. The data processing system of claim 11, wherein the graphical indication is a thread text attribute defined to indicate the thread swap has occurred, and wherein the thread text attribute is one or more of color, font size, background color, bolding, and italics.

14. The data processing system of claim 11, wherein in executing the program code to present, by the debugger, code on the graphical user interface, the processor unit executes the program code to present, by the debugger, the portion of the code using a first thread attribute.

15. The data processing system of claim 14, wherein in executing the program code to display, by the debugger, the graphical indication identifying the thread swap in the graphical user interface of the debugger in association with the line of code in which the thread swap occurred of the currently running application in response to the change from the initial thread to the current thread the processor unit executes the program code to display, by the debugger, the graphical indication identifying the thread swap in the graphical user interface in association with the line of code in which the thread swap occurred using a second thread attribute different from the first thread attribute in response to a change from the initial thread to the current thread.

* * * * *